US008239435B2

(12) United States Patent
Miceli

(10) Patent No.: US 8,239,435 B2
(45) Date of Patent: Aug. 7, 2012

(54) THRESHOLDING OF IMAGE DIFFENCES MAPS USING FIRST AND SECOND TWO-DIMENSTIONAL ARRAY WHEREIN RESPECTIVE EULER NUMBER IS DETERMINED

(75) Inventor: Sean Miceli, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 935 days.

(21) Appl. No.: 12/264,781

(22) Filed: Nov. 4, 2008

(65) Prior Publication Data

US 2010/0115016 A1    May 6, 2010

(51) Int. Cl.
*G06F 17/10* (2006.01)
*G06K 9/36* (2006.01)

(52) U.S. Cl. ........ 708/308; 382/149; 382/188; 382/190; 382/276

(58) Field of Classification Search .................. 708/308; 382/188, 149, 190, 276
See application file for complete search history.

(56) References Cited

U.S. PATENT DOCUMENTS

| 5,315,664 | A | 5/1994 | Kumagai | |
|---|---|---|---|---|
| 6,850,645 | B2 * | 2/2005 | Naoi et al. | 382/190 |
| 7,580,576 | B2 * | 8/2009 | Wang et al. | 382/188 |
| 7,969,617 | B2 * | 6/2011 | Rughani | 358/3.13 |
| 2003/0030637 | A1 * | 2/2003 | Grinstein et al. | 345/420 |
| 2006/0078191 | A1 * | 4/2006 | Matsumura | 382/149 |

OTHER PUBLICATIONS

"Efficient Euler-Number Thresholding," by Ciaran O Conaire, Centre for Digital Video Processing, Dublin, Ireland, Techinical Report, Aug. 2005.*
Rosin, Paul L, "Thresholding for Change Detection", iccv, pp. 274, Sixth International Conference on Computer Vision, Jan. 1998.
Rautiainen, M., et al., "Detecting Perceptual Color Changes from Sequential Images for Scene Surveillance", IAPR Workshop on Machine Vision Applications, pp. 136-139, Nov. 28-30, 2000.
Bishnu, A., et al., "A pipeline architecture for computing the Euler number of a binary image", Journal of Systems Architecture 51, pp. 470-487, Feb. 11, 2005.

* cited by examiner

*Primary Examiner* — Tammara Peyton

(57) ABSTRACT

Computer-readable media having corresponding apparatus embodies instructions executable by a computer to perform a method comprising: receiving a first array; generating a plurality of second arrays based on the first array, wherein each of the second arrays is generated using a different threshold number, and wherein each entry of the second arrays indicates whether a corresponding entry in the first array exceeds the respective threshold number; generating a first vector, wherein each entry in the first vector represents a number of connected components for a respective one of the second arrays; generating a second vector based on the first vector, wherein each entry of the second vector represents a variance of a plurality of entries, including a corresponding entry, of the first vector; generating a third vector, comprising filtering the second vector; and selecting, based on the third vector, one of the threshold numbers, of the second arrays or both.

12 Claims, 7 Drawing Sheets

THRESHOLDING OF IMAGE DIFFENCES MAPS USING FIRST AND SECOND TWO-DIMENSTIONAL ARRAY WHEREIN RESPECTIVE EULER NUMBER IS DETERMINED

FIELD

The present disclosure relates generally to image processing, and more particularly to the thresholding of image difference maps. However, various embodiments can be used to process any sort of two-dimensional array.

BACKGROUND

An image difference map is an array of entries, where each entry represents a difference between the values of corresponding pixels in two images. In a grayscale image, an entry can represent a difference in intensity. In a color image, an entry can represent the magnitude of a vector between the color space coordinates of the corresponding pixels. Difference maps are generally used to detect changes between two images such as video frames.

Image difference maps are generally thresholded to mitigate noise. That is, a pixel is considered to differ between two images only when the value of the pixel's entry in the image difference map exceeds a threshold number. A challenge arises in selecting a proper threshold number that will mitigate noise while still properly indicating image changes.

SUMMARY

In general, in one aspect, an embodiment features computer-readable media embodying instructions executable by a computer to perform a method comprising: receiving a first two-dimensional array; generating a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number; generating a first vector, wherein each entry in the first vector represents a number of connected components for a respective one of the second two-dimensional arrays; generating a second vector based on the first vector, wherein each entry of the second vector represents a variance of a plurality of entries, including a corresponding entry, of the first vector; generating a third vector, comprising filtering the second vector; and selecting, based on the third vector, at least one of one of the threshold numbers; and one of the second two-dimensional arrays.

Embodiments of the computer-readable media can include one or more of the following features. In some embodiments, generating a first vector comprises: determining the respective number of connected components for each of the second two-dimensional arrays. In some embodiments, determining the number of connected components for each of the second two-dimensional arrays comprises: determining a respective Euler number for each of the second two-dimensional arrays. In some embodiments, filtering the second vector comprises: applying a median absolute deviation filter to the second vector. In some embodiments, the first two-dimensional array represents a difference map for a plurality of images.

In general, in one aspect, an embodiment features a method comprising: receiving a first two-dimensional array; generating a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number; generating a first vector, wherein each entry in the first vector represents a number of connected components for a respective one of the second two-dimensional arrays; generating a second vector based on the first vector, wherein each entry of the second vector represents a variance of a plurality of entries, including a corresponding entry, of the first vector; generating a third vector, comprising filtering the second vector; and selecting, based on the third vector, at least one of one of the threshold numbers; and one of the second two-dimensional arrays.

Embodiments of the method can include one or more of the following features. In some embodiments, generating a first vector comprises: determining the respective number of connected components for each of the second two-dimensional arrays. In some embodiments, determining the number of connected components for each of the second two-dimensional arrays comprises: determining a respective Euler number for each of the second two-dimensional arrays. In some embodiments, filtering the second vector comprises: applying a median absolute deviation filter to the second vector. In some embodiments, the first two-dimensional array represents a difference map for a plurality of images.

In general, in one aspect, an embodiment features an apparatus comprising: an input module to receive a first two-dimensional array; a threshold module to generate a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number; a count module to generate a first vector, wherein each entry in the first vector represents a number of connected components for a respective one of the second two-dimensional arrays; a variance module to generate a second vector based on the first vector, wherein each entry of the second vector represents a variance of a plurality of entries, including a corresponding entry, of the first vector; a filter module to generate a third vector, comprising filtering the second vector; and a select module to select, based on the third vector, at least one of one of the threshold numbers; and one of the second two-dimensional arrays.

Embodiments of the apparatus can include one or more of the following features. In some embodiments, the count module comprises: a connected component module to determine the respective number of connected components for each of the second two-dimensional arrays. In some embodiments, the connected component module comprises: an Euler module to determine a respective Euler number for each of the second two-dimensional arrays. In some embodiments, the filter module comprises: a median absolute deviation filter module to apply a median absolute deviation filter to the second vector. In some embodiments, the first two-dimensional array represents a difference map for a plurality of images.

In general, in one aspect, an embodiment features an apparatus comprising: input means for receiving a first two-dimensional array; threshold means for generating a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number; count means for generating a first vector, wherein each entry in the first vector represents a number of connected components for a respective one of the second two-dimensional arrays; variance means for generating a second vector based on the first vector, wherein each entry of the second vector represents a variance of a plurality of entries, including a corresponding entry, of the first vector; filter means for generating a third vector, comprising means for filtering the second vector; and select means for selecting, based on the third vector, at least one of one of the threshold numbers; and one of the second two-dimensional arrays.

Embodiments of the apparatus can include one or more of the following features. In some embodiments, the count means comprises: connected component means for determining the respective number of connected components for each of the second two-dimensional arrays. In some embodiments, the connected component means comprises: Euler means for determining a respective Euler number for each of the second two-dimensional arrays. In some embodiments, the filter means comprises: median absolute deviation filter means for applying a median absolute deviation filter to the second vector. In some embodiments, the first two-dimensional array represents a difference map for a plurality of images.

The details of one or more implementations are set forth in the accompanying drawings and the description below. Other features will be apparent from the description and drawings, and from the claims.

Figure 1:
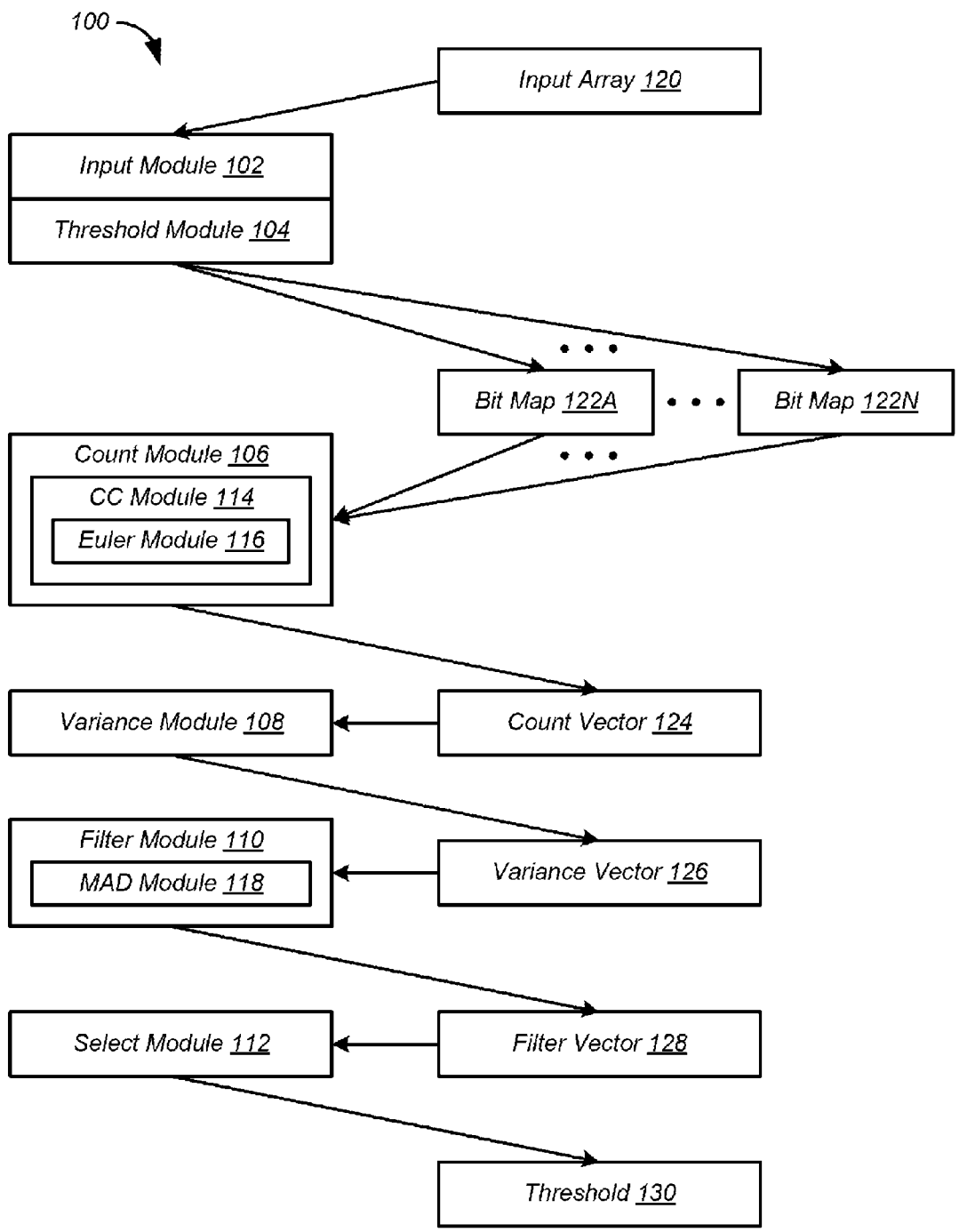
FIG. 1 shows an image processing system according to one embodiment.

The leading digit(s) of each reference numeral used in this specification indicates the number of the drawing in which the reference numeral first appears.

DETAILED DESCRIPTION

According to one embodiment, an input array, which can be an image difference map, is thresholded using a plurality of different threshold numbers to generate a plurality of bit maps. Each entry in each bit map indicates whether the corresponding entry in the input array exceeds the respective threshold number.

A count value is determined for each of the bit maps. Each count value is based on the number of connected components in the respective bit map. For example, each count value can be the Euler number for the respective bit map. The count values form a count vector.

A variance vector is generated based on the count vector, for example using a sliding window, so that each entry in the variance vector represents a variance of a plurality of entries, including the corresponding entry, of the count vector.

The variance vector is then filtered, for example using a median absolute deviation filter. Based on the filtered vector, one of the threshold numbers, one of the bit maps, or both, is selected.

FIG. 1 shows an image processing system 100 according to one embodiment. Although in the described embodiments, the elements of image processing system 100 are presented in one arrangement, other embodiments may feature other arrangements, as will be apparent to one skilled in the relevant arts based on the disclosure and teachings provided herein. For example, the elements of image processing system 100 can be implemented in hardware, software, or combinations thereof.

Referring to FIG. 1, image processing system 100 includes an input module 102, a threshold module 104, a count module 106, a variance module 108, a filter module 110, and a select module 112. Count module 106 can include a connected component (CC) module 114, which can include an Euler module 116. Filter module 110 can include a median absolute deviation (MAD) module 118.

Figure 2:
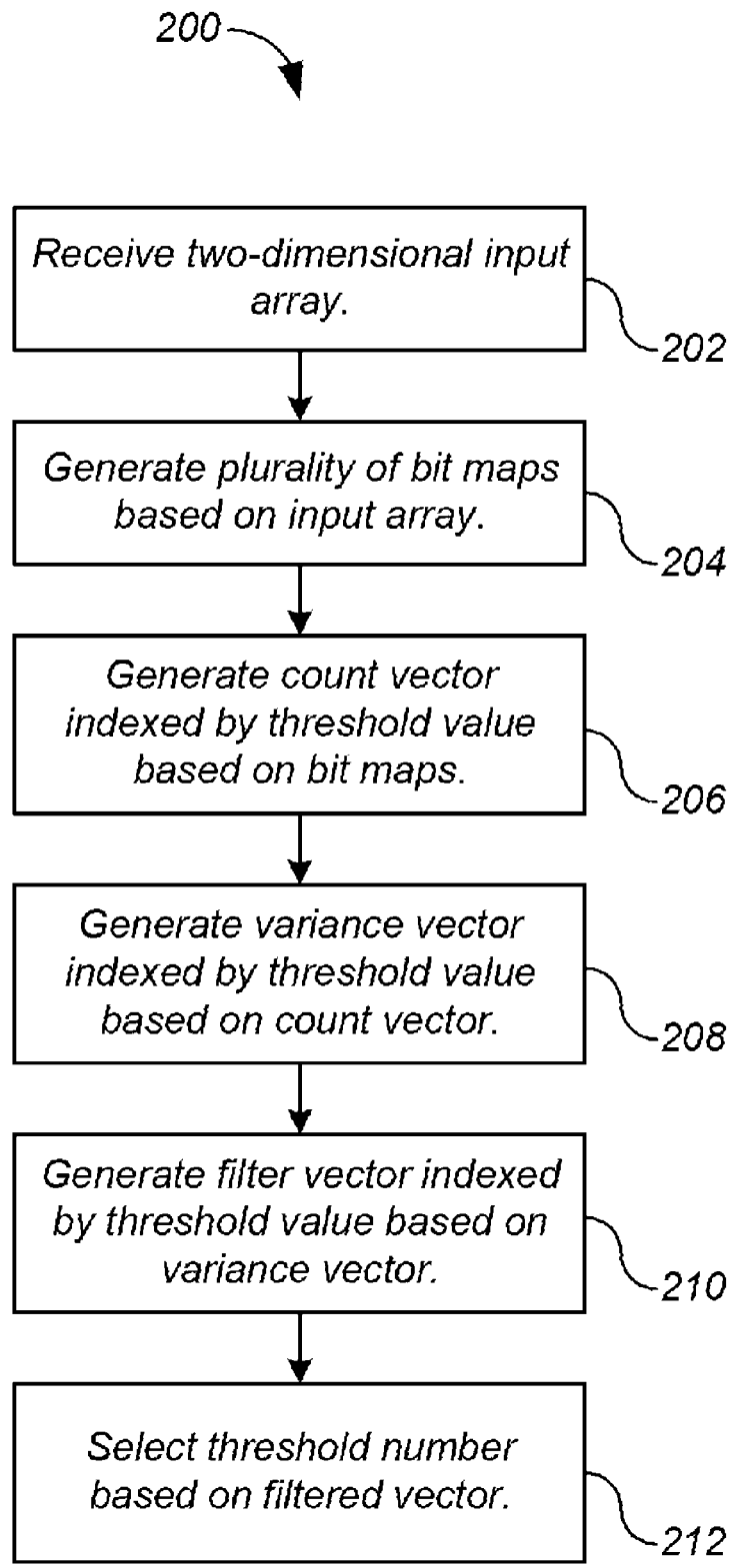
FIG. 2 shows a process for the image processing system of FIG. 1 according to some embodiments.

FIG. 2 shows a process 200 for image processing system 100 of FIG. 1 according to some embodiments. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIGS. 1 and 2, input module 102 receives a two-dimensional input array 120 (step 202). Input array 120 can represent a difference map for a plurality of images. A difference map is generally created by subtracting two images from each other. For example, it is common to produce a difference map in order to detect changes between frames of a video.

A difference map indicates how much each pixel has changed between two images. For example, if the original two images are 24-bit RGB images, then each entry in the difference map will have a value ranging from 0-255 with 0 indicating no change and 255 indicating total change.

Often the only concern is whether a change has occurred. Therefore, the difference map is thresholded using a value in the range to produce a bit map. Each entry in the bit map can have only one of two values, generally 0 or 1. For example, a value of 0 indicates the corresponding entry in the difference map fell below the threshold, while a value of 1 indicates the corresponding entry in the difference map equaled or exceeded the threshold. The only remaining question is the choice of the proper threshold number. However, this question is complicated by extraneous factors.

In a perfect world, if two images are taken of the same scene, the entries in a difference map for the two images would be all zeros. But due to subtle environmental variations, imperfect capture devices, and the like, the difference map entries generally are not zero. For example, slight lighting changes due to flickering fluorescent lamps can cause images of the same scene to differ. As another example, noise generated by a video camera during the video capture process can differ between otherwise identical frames. These subtle variations makes it difficult to differentiate actual changes from changes due to the capture process or inconsequential environmental changes.

To mitigate these extraneous factors, a plurality of such bit maps are produced, each using from a different threshold number. The bit maps are then analyzed to select a one of the bit maps, the corresponding threshold number, or both, as described in detail below.

Referring again to FIGS. 1 and 2, threshold module 104 generates a plurality of bit maps 122A-N based on input array 120 (step 204). Each bit map 122 is a two-dimensional array generated using a different threshold. Each entry of each bit map 122 indicates whether the corresponding entry in input array 120 exceeds the respective threshold. Preferably a bit map 122 is generated for each possible value of the entries in input array 120, taken in order.

Count module 106 generates a count vector 124 indexed by threshold number based on bit maps 122 (step 206). Each entry in count vector 124 represents a number of connected components for the respective bit map 122. Count module 106 can include a connected component module 114 to determine the number of connected components for each bit map 122.

Determining the number of connected components can be an expensive operation. An alternative approach is to determine the Euler number. The Euler number is the difference between the number of connected components and the number of holes in the components. The Euler number can be calculated efficiently using a scan line technique. Therefore, in some embodiments, connected component module 114 includes an Euler module 116 to determine a respective Euler number for each bit map 122.

Figure 3:
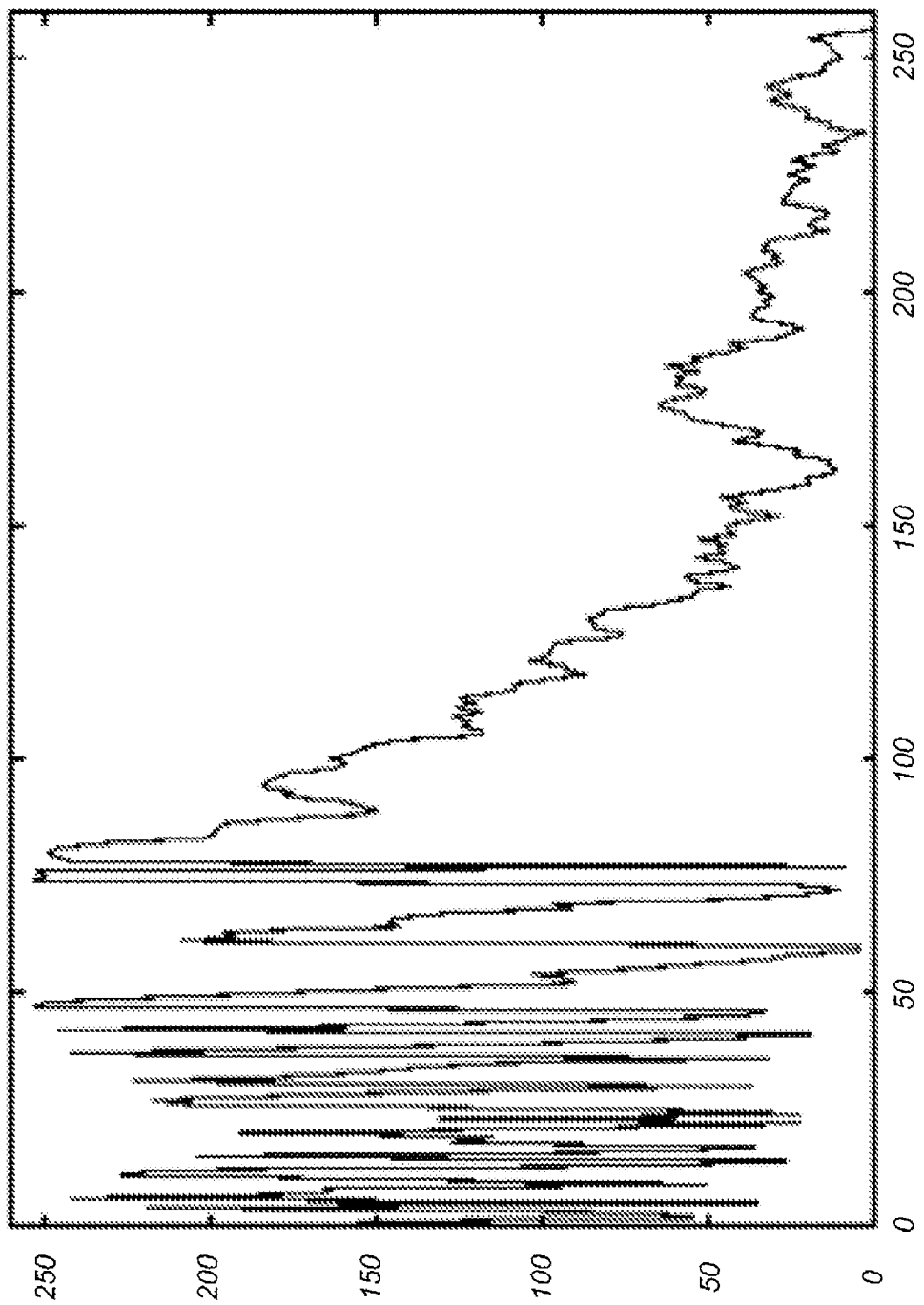
FIG. 3 shows a plot of Euler numbers for a typical difference map.

FIG. 3 shows a plot of Euler numbers for a typical difference map. In FIG. 3, the Euler numbers vary widely for lower threshold numbers due to extraneous factors such as noise, but then fall off exponentially to produce a "trough" at a threshold number of approximately 160. This trough generally represents a good choice for the threshold to use with the difference map. However, the trough is often not as apparent as in the typical case of FIG. 3.

Figure 4:
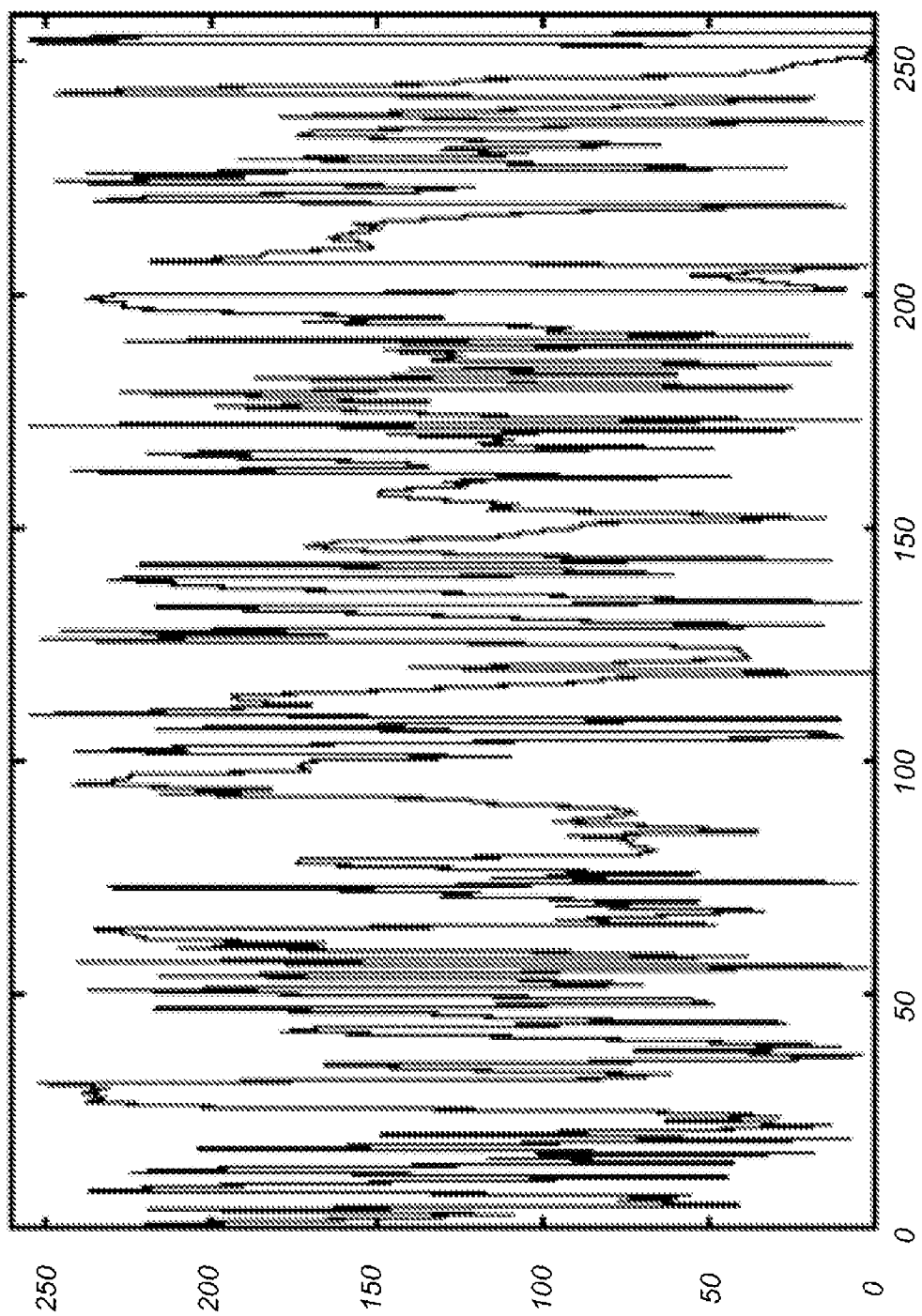
FIG. 4 shows a plot of Euler numbers for an atypical difference map.

FIG. 4 shows a plot of Euler numbers for an atypical difference map. In FIG. 4, the Euler numbers do not fall off exponentially, and no trough is apparent. Atypical difference maps often result from large differences between images, for example such as occurs with a scene change in a video. To accommodate such atypical cases, a variance of count vector 124 is taken.

Figure 5:
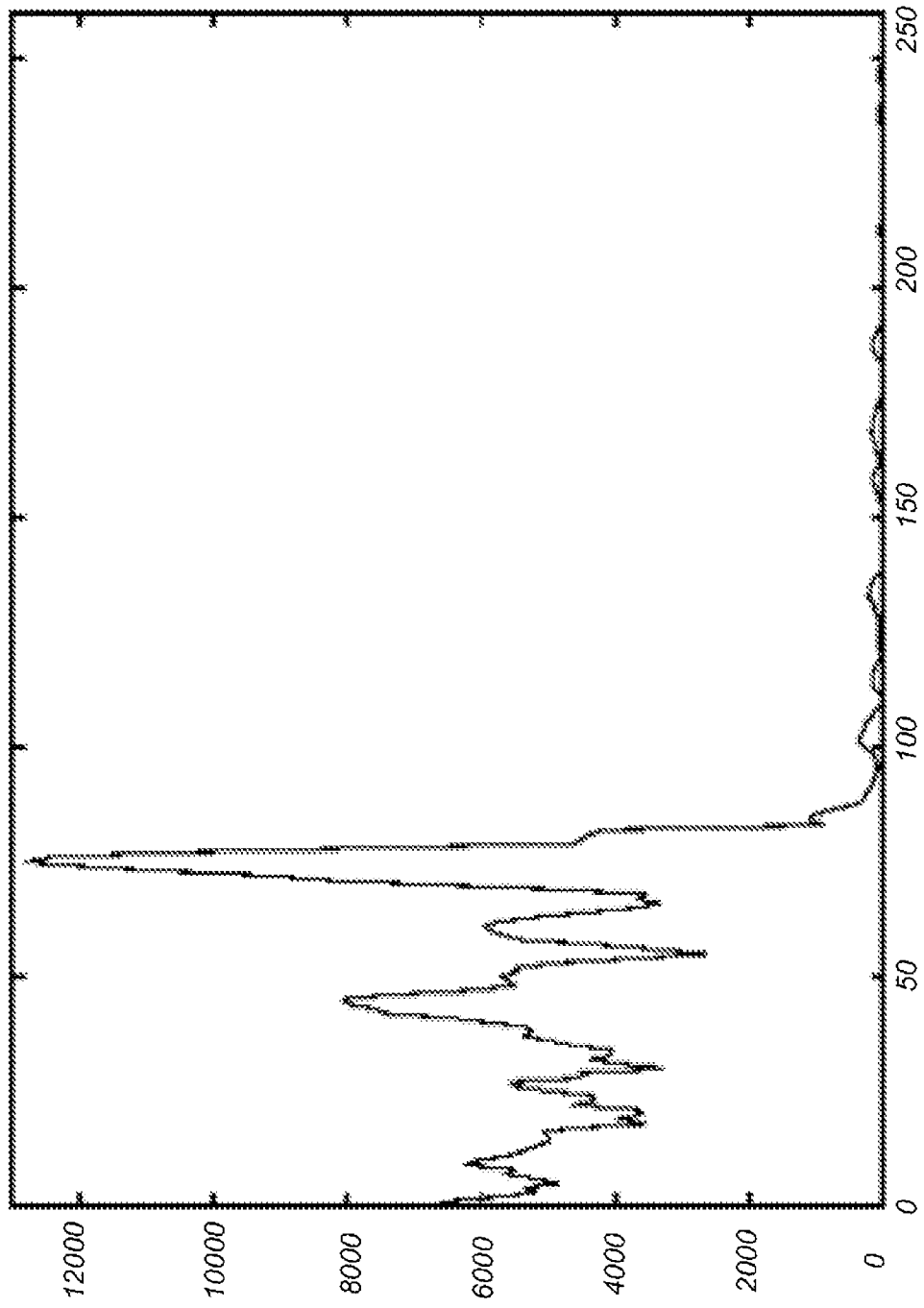
FIG. 5 shows a plot of a variance vector for the typical case of FIG. 3.
Figure 6:
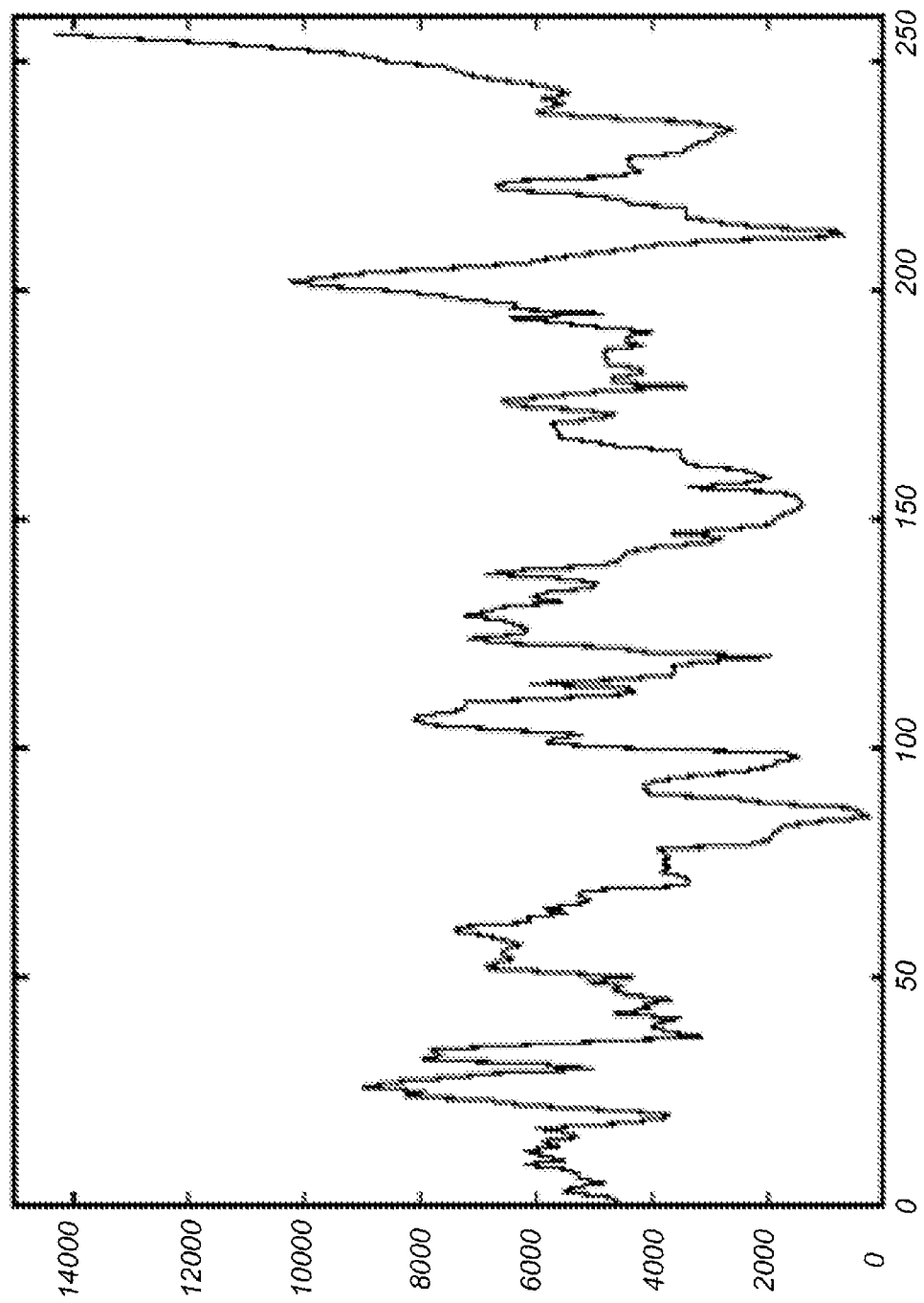
FIG. 6 shows a plot of a variance vector for the atypical case of FIG. 4.

Referring again to FIGS. 1 and 2, variance module 108 generates a variance vector 126 indexed by threshold number based on count vector 124 (step 208). Each entry of variance vector 126 represents a variance of a plurality of entries, including a corresponding entry, of count vector 124. To generate variance vector 126, the variance is computed over a window in count vector 124 including entries corresponding to a plurality of consecutive threshold numbers. For example, a sliding window with a window size of 10 can be used. FIG. 5 shows a plot of variance vector 126 for the typical case of FIG. 3. FIG. 6 shows a plot of variance vector 126 for the atypical case of FIG. 4.

Figure 7:
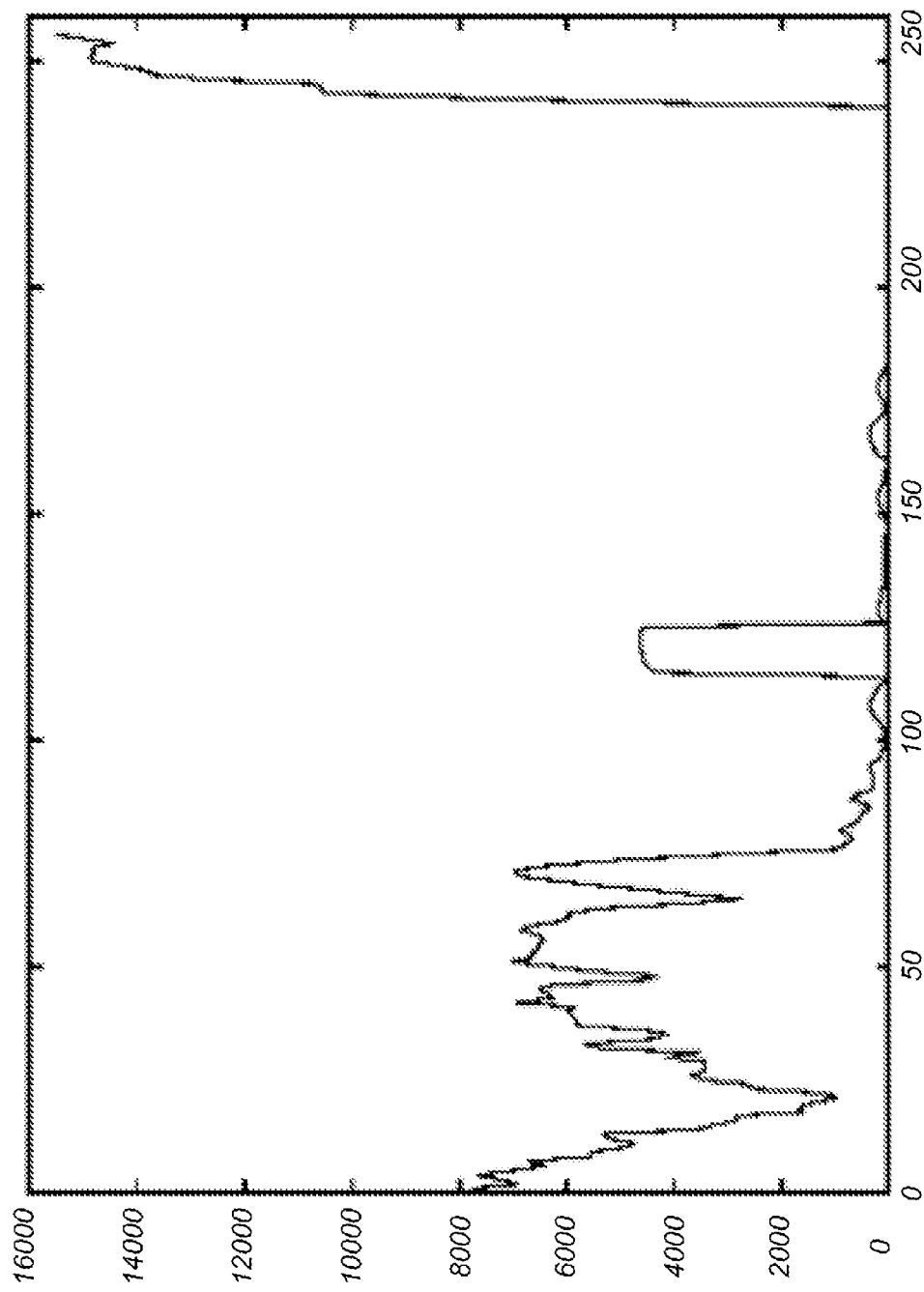
FIG. 7 shows a plot of a variance vector including two spikes.

In some cases, variance vector 126 can include unwanted spikes. FIG. 7 shows a plot of a variance vector 126 including two spikes. Referring to FIG. 7, the two unwanted spikes occur at threshold numbers of approximately 120 and 250. To remove unwanted spikes such as those shown in FIG. 7, variance vector 126 is filtered.

Referring again to FIGS. 1 and 2, filter module 110 generates a filtered vector 128 based on variance vector 126 (step 210). In some embodiments, filter module 110 uses a sliding window approach with a window size of 20.

In some embodiments, filter module 110 includes a median absolute deviation (MAD) module 118. At each step of the window, the MAD module 118 computes the median absolute deviation of only the peak values. If there is a peak that is over 3 times the median absolute deviation, that peak is removed. Any peak removal technique can be used. For example, a peak can be removed by finding the lowest point on each side of the peak and performing a linear interpolation between each to the two minimum values for any values that are needed in the region of the removed spike.

Filter module 110 should preserve the falling edge following the initial large variance changes, which can be seen for example in FIG. 7 at a threshold number of approximately 75. To keep from removing this falling edge, a peak is removed only if the current window and the window to the left of the current window have similar median absolute deviation magnitudes. For example, the magnitudes are considered similar when within 25% of each other. In some embodiments, this is only done when the median absolute deviation is small compared to the range over the entire vector, for example when less than 10% of the range.

Next, select module 112 selects one of the threshold numbers 130 based on filtered vector 128 (step 212). In some embodiments, select module 112 selects the difference map corresponding to the threshold number in addition to, or instead of, selecting the threshold number. In some embodiments, threshold number 130 is selected based on the trough to the right of the initial large changes in variance. For example, this trough can be seen in the plot of FIG. 5 at a threshold number of approximately 95. The first area with a median absolute deviation over a window size that is small can be used as an acceptable trough. If no trough is found, the leftmost small value of filtered vector 128 can be used as the threshold number. For example, "small" can be defined as less than 10% of the range.

Once the trough is found, threshold number 130 is selected. But while one technique for selecting threshold number 130 based on the trough is described below, others can be used instead. Threshold number 130 can be selected by searching to the left of the trough to find a local maximum. The local maximum is the first peak to the left of the trough. A peak detector can be used so that very small local maximums are ignored. Similarly, the local minimum to the right of the trough is found. A line is computed between these two points. The value of filtered vector 128 between these two points that is farthest in distance from the computed line (at right angles) is selected as threshold number 130.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. Accordingly, other implementations are within the scope of the following claims.

What is claimed is:

1. Non-transitory computer-readable media embodying instructions executable by a computer to perform a method of thresholding an image difference map comprising:
   receiving a first two-dimensional array representing an image difference map;
   generating a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number;
   generating a first vector, wherein each entry in the first vector represents a number of connected components for a respective one of the second two-dimensional arrays;
   generating a second vector based on the first vector, wherein each entry of the second vector represents a variance of a plurality of entries, including a corresponding entry, of the first vector;
   generating a third vector, comprising filtering the second vector; and
   selecting, based on the third vector, at least one of
      one of the threshold numbers; and
      one of the second two-dimensional arrays; and wherein determining the number of connected components for each of the second two-dimensional arrays comprises:
         determining a respective Euler number for each of the second two-dimensional arrays.

2. The non-transitory computer-readable media of claim 1, wherein generating a first vector comprises:
   determining the respective number of connected components for each of the second two-dimensional arrays.

3. The non-transitory computer-readable media of claim 1, wherein filtering the second vector comprises:
   applying a median absolute deviation filter to the second vector.

4. The non-transitory computer-readable media of claim 1:
   wherein the first two-dimensional array represents a difference map for a plurality of images.

5. An apparatus for thresholding an image difference map comprising:
   an input module to receive a first two-dimensional array representing an image difference map;
   a threshold module to generate a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number;
   a count module to generate a first vector, wherein each entry in the first vector represents a number of connected components for a respective one of the second two-dimensional arrays;
   a variance module to generate a second vector based on the first vector, wherein each entry of the second vector represents a variance of a plurality of entries, including a corresponding entry, of the first vector;
   a filter module to generate a third vector, comprising filtering the second vector; and
   a select module to select, based on the third vector, at least one of
      one of the threshold numbers; and
      of the second two-dimensional arrays; and wherein the connected component module comprises:
         an Euler module to determine a respective Euler number for each of the second two-dimensional arrays.

6. The apparatus of claim 5, wherein the count module comprises:
   a connected component module to determine the respective number of connected components for each of the second two-dimensional arrays.

7. The apparatus of claim 5, wherein the filter module comprises:
   a median absolute deviation filter module to apply a median absolute deviation filter to the second vector.

8. The apparatus of claim 5:
   wherein the first two-dimensional array represents a difference map for a plurality of images.

9. An apparatus for thresholding an image difference map comprising:
   input means for receiving a first two-dimensional array representing an image difference map;
   threshold means for generating a plurality of second two-dimensional arrays based on the first two-dimensional array, wherein each of the second two-dimensional arrays is generated using a different threshold number, and wherein each entry of the second two-dimensional arrays indicates whether a corresponding entry in the first two-dimensional array exceeds the respective threshold number;
   count means for generating a first vector, wherein each entry in the first vector represents a number of connected components for a respective one of the second two-dimensional arrays;
   variance means for generating a second vector based on the first vector, wherein each entry of the second vector represents a variance of a plurality of entries, including a corresponding entry, of the first vector;
   filter means for generating a third vector, comprising means for filtering the second vector; and
   select means for selecting, based on the third vector, at least one of
      one of the threshold numbers; and
      one of the second two-dimensional arrays; and wherein the connected component means comprises:
         Euler means for determining a respective Euler number for each of the second two-dimensional arrays.

10. The apparatus of claim 9, wherein the count means comprises:

connected component means for determining the respective number of connected components for each of the second two-dimensional arrays.

11. The apparatus of claim 9, wherein the filter means comprises:
median absolute deviation filter means for applying a median absolute deviation filter to the second vector.

12. The apparatus of claim 9:
wherein the first two-dimensional array represents a difference map for a plurality of images.

* * * * *